United States Patent

[11] 3,586,815

| [72] | Inventors | Jacobus Van Eijnsbergen;<br>George O'Neal, Jr., both of Bloomfield Hills, Mich. |
|---|---|---|
| [21] | Appl. No. | 810,499 |
| [22] | Filed | Mar. 26, 1969 |
| [45] | Patented | June 22, 1971 |
| [73] | Assignee | Weltronic Company<br>Southfield, Mich. |

[54] WELDING CONTROL MECHANISM
22 Claims, 9 Drawing Figs.

| [52] | U.S. Cl. | 219/110 |
|---|---|---|
| [51] | Int. Cl. | B23k 9/10 |
| [50] | Field of Search | 219/108, 109, 110 |

[56] References Cited
UNITED STATES PATENTS

| 2,472,042 | 5/1949 | Davies | 219/110 |
|---|---|---|---|
| 3,149,221 | 9/1964 | Watter, et al. | 219/110 |
| 3,345,493 | 10/1967 | Guettel et al. | 219/110 |
| 3,389,239 | 6/1968 | Treppa et al. | 219/109 X |

*Primary Examiner*—Bernard A. Gilheany
*Assistant Examiner*—Roy N. Envall, Jr.
*Attorney*—Harness, Dickey and Pierce ABSTRACT: A control circuit which is particularly adapted to be utilized in conjunction with a welding circuit wherein the voltage across the welding electrodes and the current through the work is sensed for a variable period of time which is related to the magnitude of the current. These signals are then utilized to derive the resistance of the load or the work being welded, the system being capable of automatically terminating the weld when a preselected degree of resistance drop at the weld is sensed by the feedback control circuit.

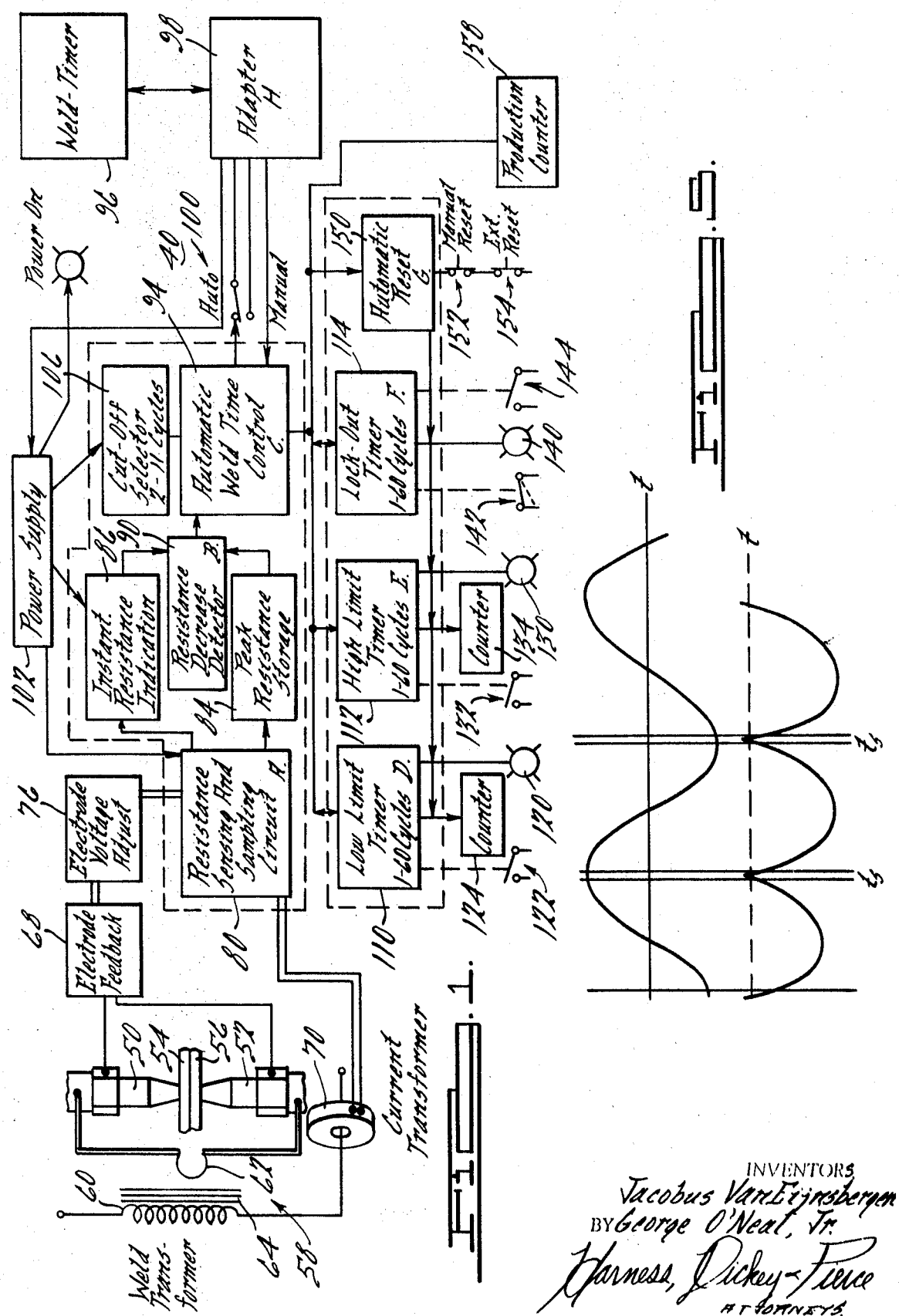

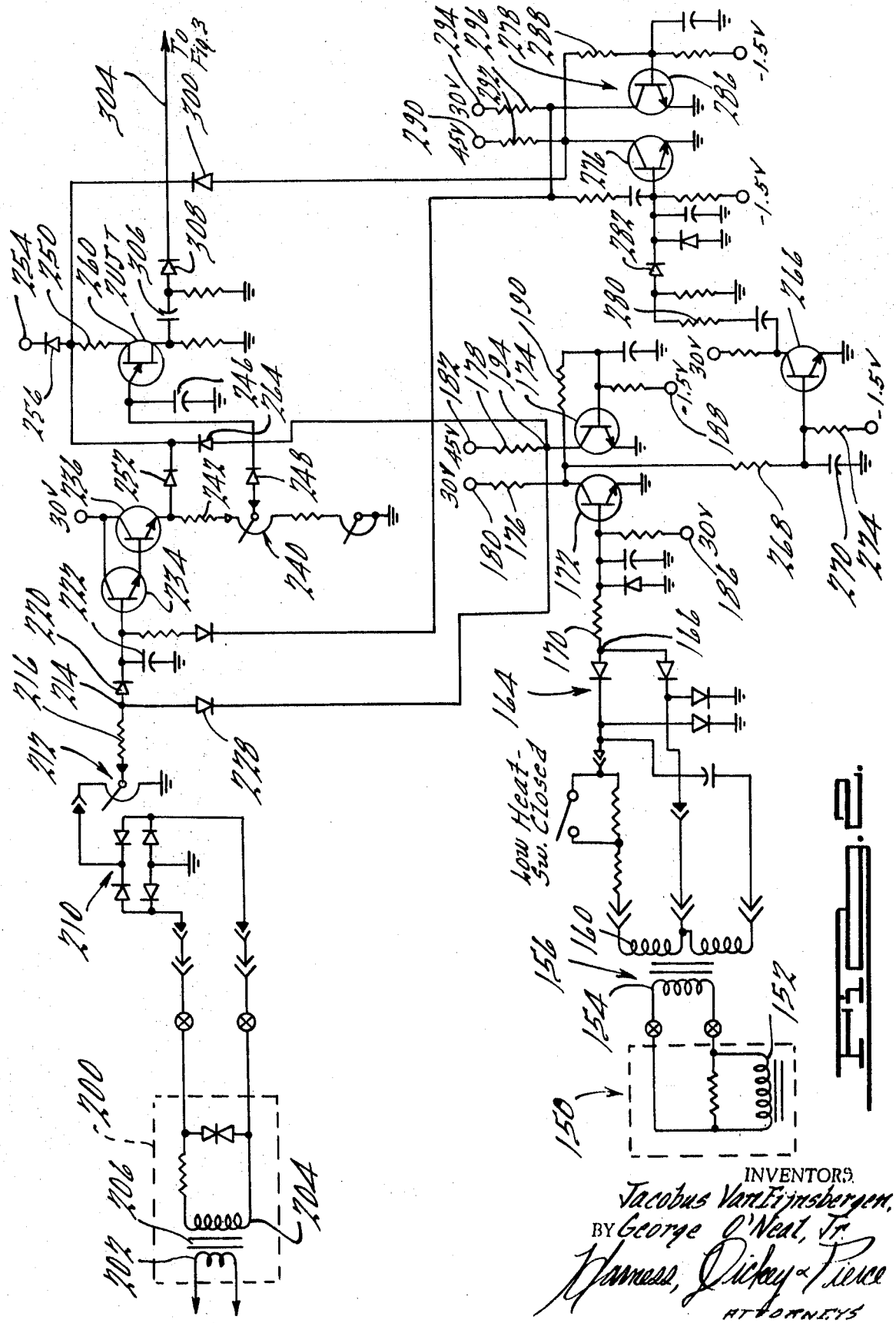

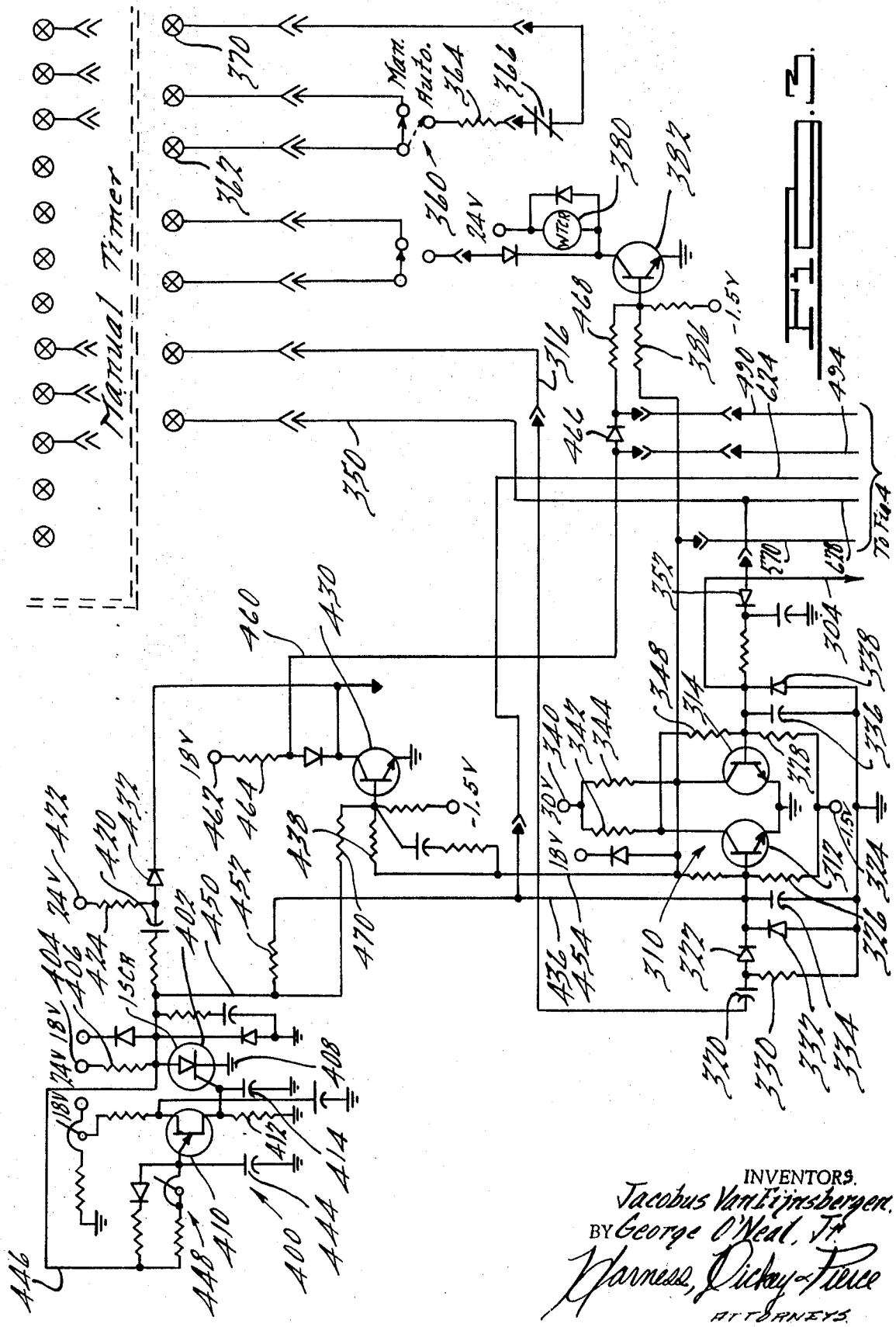

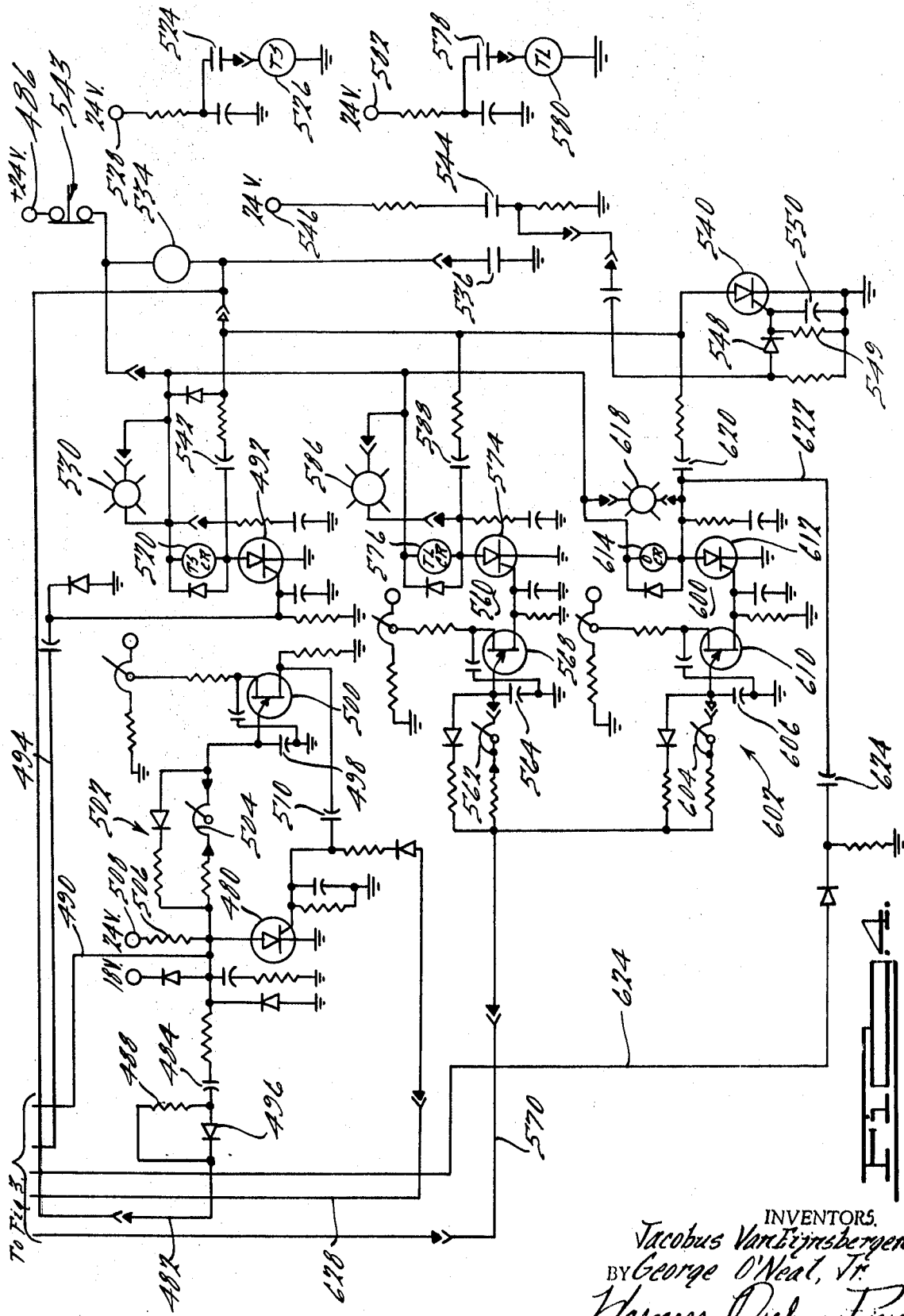

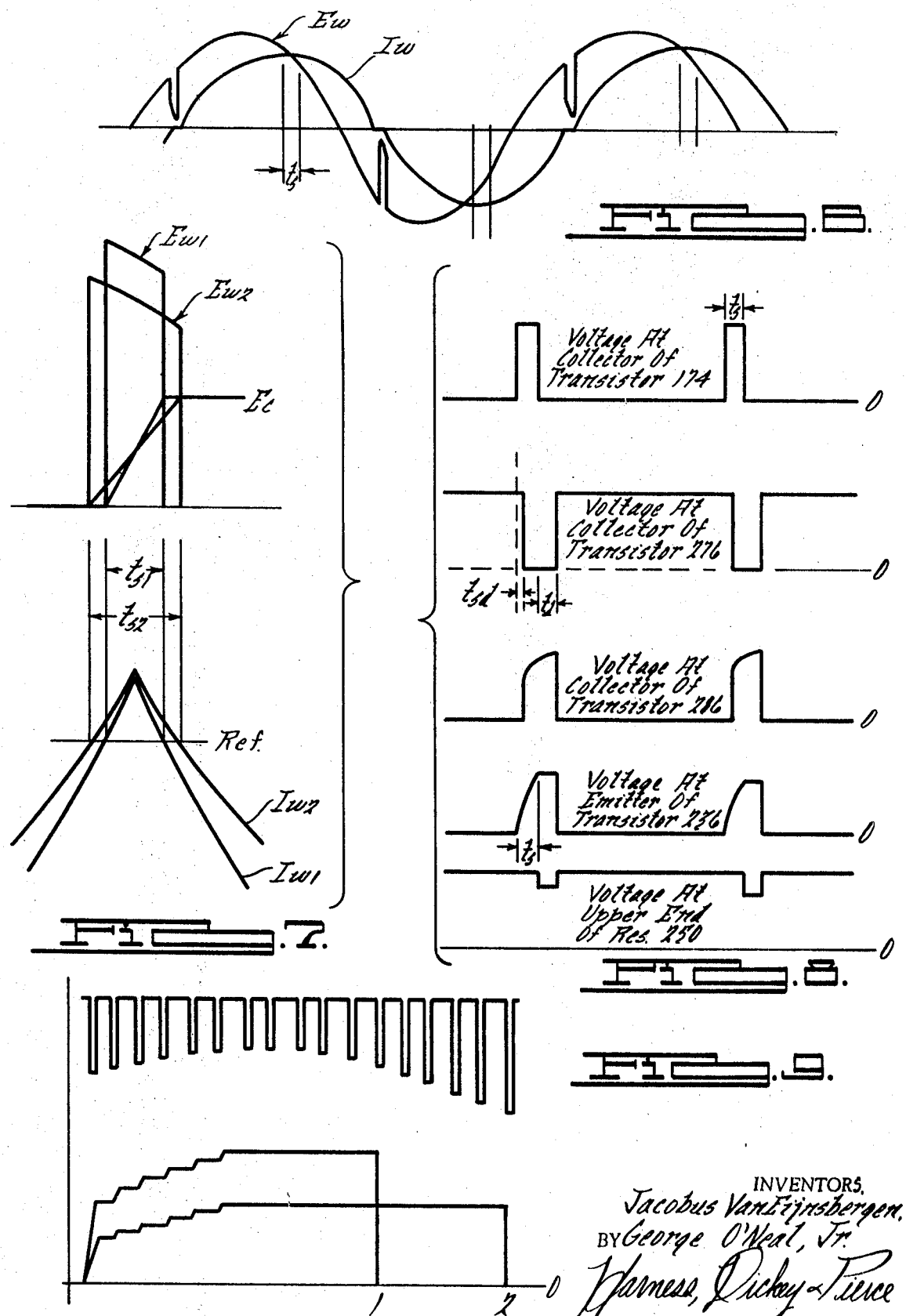

3,586,815

WELDING CONTROL MECHANISM

BACKGROUND AND SUMMARY OF THE INVENTION

This invention relates generally to an impedance sensing control circuit and more particularly to a control circuit for controlling the duration of a weld cycle in a welding operation in response to the sensing of a preselected resistance condition in the circuit between the welding electrodes.

In certain prior art welding systems, timers have been provided which, when initiated, count a predetermined presettable number of pulses and terminate the weld time at the end of the count of preselected pulses. Obviously, this system does not take cognizance of variations in materials being welded, the pressure being exerted to hold the pieces of stock together, the surface condition of the stock and other factors which affect the quality of the weld being performed.

Subsequently, a system was devised for sensing the condition of the weld, and, by continuously monitoring certain electrical conditions during the weld time, the quality of the weld may be detected, and the weld portion of the welding cycle may be terminated when the desired weld is achieved. However, these prior systems do not have provisions for sensing other variables in the system, as for example, line voltage changes, impedance changes, and other variations which tend to change the weld conditions, and utilized this information to vary the weld time to achieve the optimum weld.

In accordance with certain features of the present invention, a control system in the form of an automatic weld timer has been provided for automatically controlling the duration of the time that electrical energy is applied to the welding electrodes, the duration being related to certain selected electrical conditions at the electrodes. Particularly, the electrode voltage and current to the load are sensed and utilized to indicate the resistance between the weld electrodes, and the weld is terminated upon the sensing of a preselected change in welding resistance.

In accordance with certain other features of the present invention, this electrode voltage and the load current is sensed during a sample time, the sample time being selected to occur when the load current is at a maximum or minimum or a zero change of current with respect to time. In this way, the purely resistive portion of the load impedance is sensed and utilized to control the weld time, and the reactive portion of the impedance is eliminated. Also, it is well known that certain conditions at the weld may change, thus causing a change in sensed voltage or current without a correlative change in weld resistance.

Thus, it has been found desirable to vary the duration of sampling time in accordance with certain electrical conditions of the load. Particularly, the amplitude of the load current is sensed and the sample time is varied in accordance with changes in the sensed load current. Thus, for a large load current, indicative of a rise in line voltage, the sample time is decreased in a novel manner to achieve a constant electrical condition within the control system when there is a constant resistance at a welding load. Particularly, an RC circuit is charged. During the sample time, the charge level of the capacitor is related to the line voltage and duration of sampling time. Thus, the capacitor will charge at a more rapid rate with a higher line voltage, and will achieve a maximum charge as determined by the duration of the sample time and the line voltage.

Also, other features have been incorporated in the present invention to monitor certain weld conditions. For example, limit controls have been provided to limit the minimum and maximum number of pulses which are passed through the load for a particular weld. Further, a system has been provided to preclude the system from terminating a weld until the weld time has exceeded a preselected minimum limit. Also, certain counters have been provided to count the number of times that the weld reaches certain maximum settings and certain minimum settings and also number of times that the weld time has been initiated. Further, heat control and voltage adjustments are provided.

Accordingly, it is one object of the present invention to provide an improved control system for a welding circuit.

It is another object of the present invention to provide an improved circuit for timing the duration of a weld cycle in a welding system.

It is a further object of the present invention to provide an improved control circuit for a welding system which senses the resistive condition of the weld and utilizes a preselected resistive condition to terminate the weld cycle.

It is still a further object of the present invention to provide an improved feedback circuit for a welding system which samples certain electrical parameters at the weld to derive the resistance of the load circuit, the sampling time of the sensing circuit being varied in accordance with the voltage and current magnitude to the load circuit.

It is a still further object of the present invention to provide an improved control circuit for a welding system which senses the electrode voltage and load current to derive the resistance of the weld during a sampling time, the sampling time being varied in accordance with the variation of the welding current.

Further objects, features and advantages of this invention will become apparent from a consideration of the following description, the appended claims and the accompanying drawings in which:

FIG. 1 is a block diagram of the system of the present invention illustrating certain preferred features thereof;

FIG. 2 is a schematic diagram of a portion of a preferred system incorporating certain features of the present invention;

FIG. 3 is a schematic diagram illustrating another portion of the preferred system of FIG. 2;

FIG. 4 is another schematic diagram illustrating the remaining portion of the system of FIG. 2 incorporating features of the present invention;

FIG. 5 is a waveform illustrating the relationship between electrode voltage and the load current flowing through the welding load;

FIG. 6 is another waveform illustrating the relationship between electrode voltage and load current further illustrating the sample time as related to load current;

FIG. 7 is a composite wave diagram illustrating the relationship between two different electrode voltages as related to the resultant load current, the relationship between the above two curves and resistance, and the charge on a capacitor to indicate the resistance of the load circuit;

FIG. 8 is a composite waveform diagram illustrating the voltages at certain selected points within the control circuit described in conjunction with FIGS. 2 to 4; and FIG. 9 is a compounded waveform illustrating the relationship between the resistance curve and the preselected resistance value which is utilized as a comparative circuit for triggering the timing circuit.

Referring now to FIG. 1, there is illustrated a block diagram of a preferred control system 40 adapted to be utilized in a welding circuit and incorporating certain features of the present invention. Specifically, a first and second welding electrode 50, 52 are adapted to removably hold a pair of pieces of stock 54, 56 such that, upon applying the proper pressure and welding current, the pieces 54, 56 will be spot welded together. The electrical energy for welding the work pieces 54, 56 are provided by a welding transformer which includes a primary winding 60 connected to a suitable source of electrical energy and a secondary winding 62 which is magnetically coupled with the primary winding 60 through a magnetic core 64 and electrically connected to the electrodes 50, 52. The system thus described is a conventional spot welding apparatus of the type presently in wide use.

As stated above, the control system is adapted to sense certain electrical conditions at the welding load and derive a signal which varies in accordance with the changes in resistive value at the load. In the particular system disclosed, the voltage across the electrodes 50, 52 is sensed by means of an electrode feedback circuit 68 and the current flowing in the primary winding 60 is sensed by means of a current transformer device 70 magnetically coupled with the primary winding 60 of a conductor connected thereto. The voltage signal from the electrode feedback circuit 68 is fed to an electrode voltage adjust circuit 76 which permits the adjustment of the signal being fed from the electrodes to the output portion of the electrode voltage adjust circuit 76. In this way, the effect of the voltage signal may be varied.

This output signal from the voltage adjust circuit 76 is fed to a resistance sensing and sampling circuit 80. Similarly, the current signal from the current transformer 70 is also fed to the resistance sensing and sampling circuit 80. As will be seen from the following discussion, the resistance sensing and sampling circuit samples the voltage magnitude of the output signal from the voltage adjust circuit 76 and also the current magnitude from the output circuit from the current transformer 70 during a predetermined sampling time, this sampling time being selected to occur when the current is at a maximum or minimum amplitude. Thus, the rate of change of current with time is zero to provide a purely resistive indication of the impedance of the circuit, and the inductive portion of the impedance is eliminated. The sensing and sampling circuit 80 is capable of generating an output signal which is indicative of the resistance of the load between the electrodes 50, 52.

The output of the resistance sensing and sampling circuit 80 is fed to a peak resistance storage circuit 84, which circuit stores the peak to which the resistance rises during any particular welding cycle. Of course, resetting means have been provided to reset the peak resistance storage circuit means 84 each time the welding cycle is terminated. On the other hand, the resistance signal is also fed to an instantaneous resistance indication circuit 86 which records the instantaneous value of the resistance at the load between the electrodes 50, 52. Of course, the instantaneous resistance is registered only during the sampling time set in the sampling circuit 80.

The output from the peak resistance storage circuit 84 and the instantaneous resistance circuit 86 are fed to a resistance decrease detector circuit 90 which compares the peak resistance, as generated by circuit 84, with the instantaneous resistance signal, as generated by the circuit 86. When the resistance drops below the peak resistance by a preselected amount, the resistance decrease detector circuit 90 generates a control signal which is fed to the automatic weld time control circuit 94. This signal is utilized to terminate the weld cycle.

This termination of the weld cycle is accomplished by substituting the automatic weld time control circuit 94 generally described above for the normal weld timer circuit 96 found in welding systems presently in use. The weld timer circuit 96 generally is of the type having a preselected pulse-counting circuit which counts the number of pulses occurring during the weld portion within a particular welding cycle, which cycle generally includes the squeeze, weld, hold and off portions. When the preselected number of pulses have occurred, the weld timer circuit 96 will terminate the weld portion. However, as was stated above, this system does not take into account the change in welding load described above.

An adapter interface circuit 98 has been provided to interconnect the weld timer and the automatic weld time control circuit 94. Also, an automatic or manual switch 100 has been provided, the automatic position being utilized to place the welding system under the control of the automatic weld time control circuit 94 and the manual setting being utilized to place the welding system under the control of the weld timer 96. Also, a power supply 102 has been provided to supply electrical energy to the various circuits including circuits 80 and 86.

Certain other controls have been provided which limit the operation of the automatic weld time control circuit 94 irrespective of the conditions at the electrodes 50, 52. An example of such a control is the cutoff selector circuit 106 which circuit inhibits the operation of the automatic weld time control circuit during a preselected number of initial welding cycles. The cutoff selector may be set to any number from 2 to 11 cycles and will preclude the automatic weld time control circuit 94 from terminating the weld cycle until such time as the requisite minimum number of cycles has been sensed by selector 106.

This circuit is provided to preclude the weld time control circuit from terminating a weld when the requisite resistance drop is sensed due to variations in pressure, surface contact or other such parameters during an initial contact of the electrodes 50, 52 with the work 54, 56. For example, the initial pressure may raise the resistance to a false high level and then lower the resistance to the trip point thereby automatically terminating the weld time prior to achieving an optimum weld. The power supply 102 also supplies electrical energy for the cutoff selector circuit 106.

Further, a low limit timer circuit 110, a high limit timer circuit 112 and a lockout timer circuit 114 are provided to give the operator an additional indicator of the minimum and maximum number of cycles which are utilized in the welding operation depending on the particular material or thickness being utilized.

The timer circuit 110 establishes a minimum number of cycles which, when operative, would be greater than the number of cycles set in the cutoff circuit 106. It is to be noted that the low limit timer circuit has a greater range of selectability, that is, from 1 to 60 cycles of energy. It is desirable to indicate when the low limit timer circuit has timed out to indicate the number of times the minimum weld time has been achieved, and, to this end, an indicating light 120 is provided with an external indicating switch 122. The number of times that the low limit circuit establishes termination of the weld time is counted by means of a counter circuit 124 to provide a running count of the operation of the low limit timer.

Similarly, the high limit timer establishes a maximum number of cycles, from 1 to 60 cycles, at which the automatic weld time control circuit will trip an indicator. As was the case with the low limit timer 110, an indicator light 130, an external indicating switch 132 and a counter in at 134 are provided. The lockout timer circuit 114 is utilized to limit the maximum number of pulses that may be utilized by the system in achieving an optimum weld or to limit the absolute maximum number of pulses that may be utilized in any particular weld cycle. In this way, a condition at the welding electrodes 50, 52 would not be permitted to persist and continue feeding electrical energy to the electrodes 50, 52 if a proper weld is not going to be achieved within a reasonable time. The lockout timer will automatically terminate the weld cycle when the preset number of maximum cycles has been achieved, this termination occurring through the automatic weld time control circuit 94. An indicator light 140 and external switches 142, 144 are provided.

Obviously, the counters 124, 134 and the circuits 110, 112 and 114 must be reset after each welding cycle. Accordingly, an automatic reset circuit 150 is provided to generate an output signal to reset the above named circuit each time that a new welding cycle is initiated. Also, a manual reset, an external reset are provided through manual reset and external reset switches 152, 154 respectively. Also, a production counter circuit 158 is connected to sense each time that the welding portion of the cycle is initiated and stores the number of welds until such time that the production counter is reset either at the end of a production run, at the end of a day, etc.

Referring now to FIGS. 2 to 9, there is illustrated the specific circuit details of a preferred welding control system incorporating the features of the present invention and certain waveforms which are present at particular points within the schematic diagrams illustrated in FIGS. 2 to 4. Particularly, the system includes a current transformer 150 which includes a secondary winding 152 magnetically coupled to the current flowing in the primary circuit of the main welding transformer described in conjunction with FIG. 1. The voltage induced in secondary winding 152 causes a current to flow through a primary winding 154 of a transformer 156, this current inducting a voltage across a center tapped secondary winding 160. The output of secondary winding 160 is fed to a rectifying and inverting diode bridge circuit 164 to produce an output signal at node 166 which is identical to the lower waveform of FIG. 5. The combination just described forms what is known as an Alexanderson phase shift circuit, which shifts the output waveform 90° from the input and rectifies the input signal. Thus, referring to FIG. 5, the lower waveform is shifted 90° from the input waveform illustrated at the upper portion of FIG. 5 and the lower waveform is full wave rectified.

The wave form at node 166 is fed through a resistor 170 to one of the base electrodes of a pair of flip-flop connected transistors 172, 174. The transistor 174 is normally conductive and the transistor 172 is normally nonconductive in the standby state. The collector-emitter current is supplied to transistors 172, 174 by means of resistors 176, 178 connected to input power supplies 180, 182, respectively. The emitter electrodes of transistors 172, 174 are grounded and the base electrodes are supplied with a bias voltage at input terminals 186, 188. With the transistor 172 nonconductive, the transistor 174 is maintained in the conductive state by means of a cross-connected impedance 190 connected from the collector electrode of transistor 172 to the base electrode of transistor 174. With the transistor 172 nonconductive, the base electrode of transistor 174 is raised to a potential well above that of the emitter electrode of transistor 174.

However, when the waveform in the lower portion of FIG. 5 raises to a level above the dotted line designated $t$, a sufficient bias will be provided transistor 172 to render the transistor conductive. The conduction of transistor 172 will cause transistor 174 to be switched to the nonconductive state to provide an output signal at node 194 connected to the collector electrode transistor 174. This signal will remain at node 174 during the time that transistor 172 is conductive, which is directly related to the duration of the period that the signal at the lower portion of FIG. 5 remains above the dotted line $t$. As will be seen from the following discussion, the duration of the period that the waveform at the lower portion of FIG. 5 remains above the line $t$ (designated $t_s$) is directly related to the magnitude of current or the steepness with which the current waveform approaches the line $t$. This is best illustrated in FIGS. 6 and 7. Referring to FIG. 6, the electrode voltage is designated $E_w$ and is seen to be a generally sinusodial waveform with the exception of certain discontinuous portions within the wave.

As is stated above, system is so devised as to sample the voltage and current when the current is at a peak, either maximum or minimum, thus giving an indication of the pure resistive portion of the impedance. Referring to FIG. 7, it is seen that the voltage $E_w$, when it is at a particular level $E_{w1}$, will create a current $I_{w1}$ in the load circuit. The current $I_{w1}$ is above the reference level for a preselected time $t_{s1}$, this time being dependent on the magnitude of the current flowing in the circuit. On the other hand, if $E_w$ should drop to a level $E_{w2}$, a lower current $I_{w2}$ will flow in the load circuit and the current will be above the reference for a longer period of time that the current $I_{w1}$. Thus, the sample time $t_s$ will last for a duration $t_{s2}$ illustrated in FIG. 7.

As it will be explained hereinafter, the resistive level is sensed by means of charging a capacitor, the capacitor being charged for the duration of the sample time. Of course, if the sample time is lengthened, the capacitor will charge for a longer period of time and will achieve a final magnitude of charge which is directly related to the voltage being applied and the duration of the sample time. Thus if the voltage is lower, the sample time will be greater, and the charge on the capacitor will raise to the same level, absent an increase or decrease in resistance across the electrodes.

From looking at the circuit described in conjunction with FIG. 1, it is obvious that the resistance across the voltage sensing electrodes are the resistance of the electrode circuit, exclusive of the work, plus the resistance of the work itself. If we assume that the charge voltage varies in direct relationship with the resistance across the electrodes, then the following equation will hold: $E_c/R_e+R_w = a$ constant. As $R_e$ is relatively low and constant, any decrease in $R_w$ or the work resistance will decrease $E_c$. Therefore, $E_c$ may be said to vary directly as the resistance across the work.

Referring to the voltage circuit, it is seen that the voltage across the electrodes is sensed by means of an electrode feedback circuit 200 which includes a transformer having a primary winding 202 electrically connected to the electrodes, the primary winding being coupled to a secondary winding 204 through a magnetic core 206. The output of the transformer 200 is fed through a rectifier bridge 210 to a voltage adjusting potentiometer 212, this latter potentiometer being capable of adjusting the operating range of the control system.

The output of the potentiometer 212 is fed to a node 214 through resistor 216, the node 214 being connected through a diode 220 to an integrating capacitor 222. Further, the node 214 is clamped to the voltage at node 194, connected to the collector electrode transistor 174, by means of a diode 228. Thus, the conduction and nonconduction of the transistor 174 controls the feeding of energy from the potentiometer 212 to the capacitor 222 by clamping the node 214 substantially to ground during the nonsampling time and permitting the node 214 to achieve approximately the voltage being fed from potentiometer 212 during the sampling time.

This operation is obvious from a consideration of the face that the transistor 174 is normally conductive during the period other than the sampling time. This conductivity of transistor 174 pulls the voltage at node 214 down to approximately ground potential, varying from ground potential only by the drop of diode 228 and the collector-emitter circuit voltage of transistor 174. During the sampling time, the transistor 172 is rendered conductive which, in turn, renders transistor 174 nonconductive. This raises the voltage of node 194 to approximately the potential at terminal 254, in this case 30 volts, to back bias the diode 228 and isolate the current sensing circuit from node 214. Thus, the potential at node 214 is fed to the capacitor 222 to charge the capacitor to a value related to the voltage being fed thereto.

The capacitor 222 is connected to the base circuit of one transistor 234 of a Darlington configuration which includes a second output transistor 236. The emitter voltage of transistor 236 closely resembles the voltage $E_c$ described in conjunction with FIG. 7 and is seen to be related to the applied voltage from the voltage adjusting potentiometer 212 and the sample time determined by transistors 172, 174. Referring back to capacitor 222, the charge on capacitor 222 will have a slower rise the lower the voltage being fed from the voltage transformer 200. However, if the charge time is changed from, for example, $t_{s1}$ to $t_{s2}$ discussed in FIG. 7, the capacitor will charge to the same voltage due to the longer sample time, assuming that the resistance of the work has not changed.

The output of transistor 236 is connected to a resistance change potentiometer 240 through a resistor 242, this voltage being in turn fed to storage capacitor 246 connected to the potentiometer 240 through a diode 248. On the other hand, the instantaneous voltage at emitter electrode of transistor 236 is fed to a base 2 resistor 250 by means of a diode 252, the base 2 resistor being connected to a potential at input terminal 254 through a diode 256. The resistor 250 is connected to the base 2 of an uninjunction transistor 260 such that the base 2 potential varies in accordance with the instantaneous variations in voltage on capacitor 222 and the peak voltage achieved by capacitor 222 is fed to the capacitor 246 and stored thereon. The capacitor 246 is connected to the emitter electrode of uninjunction transistor 260 and stores the maximum resistance level. Obviously, the uninjunction transistor 260 compares the voltage being fed to the base 2 electrode with that impressed on the emitter electrode and breaks over when the proper conditions are achieved for conduction through the unijunction transistor 260.

The voltage at node 194 is also fed to the upper end of resistor 250 by means of a diode 264 to supply approximately 30 volts to the upper end of resistor 250 during the period that transistor 174 is nonconductive. Also, the collector voltage of transistor 172 is fed to a driver transistor 266 through a resistor 268, the potential at the collector being fed thereto with a slight delay due to the discharging of capacitor 270. As stated above, the transistor 172 is normally nonconductive during the nonsample time. Thus, the capacitor 270 maintains a charge from the supply at terminal 180 through resistors 176 and 268. This charge on capacitor 270 maintains transistor 266 in the conductive state, even after transistor 172 has been rendered conductive until such time as the charge on capacitor 270 has fallen off sufficiently below the potential required to switch transistor 266 to the nonconductive state.

A negative bias is applied to the base electrode transistor 266 through a resistor 274 to insure that the transistor 266 is cut off after discharge of capacitor 270. The nonconductive condition of transistor 266 feeds a positive pulse to the base electrode of one transistor 276 of a flip-flop circuit 278 through a resistor 280 and a diode 282. The conduction of transistor 276, the transistor 276 being normally nonconductive, causes a normally conductive transistor 286 to be rendered nonconductive due to the cross coupling between the collector electrode of transistor 276 and the base electrode of transistor 286 through a resistor 288. Collector-emitter current for transistors 276 and 286 is supplied from terminal-resistor combinations 290, 292 and 294, 296, respectively.

The voltage at the collector electrode 276 is also fed to the upper end of resistor 250 through a diode 300, this voltage again being approximately 30 volts when the transistor is rendered nonconductive. Of course, when the transistor 276 is rendered conductive, the diode 300 is back-biased to isolate resistor 250 from the circuit including transistor 276. A similar situation occurs when transistor 174 is rendered conductive in that the diode 264 is back-biased and isolates the circuit of node 194.

Thus, the voltage at the upper end of resistor 250 is controlled by the emitter electrode of transistor 236 in the Darlington configuration through diode 252, the collector voltage of transistor 174 through diode 264, and the collector electrode of transistor 276 through diode 300. However, there will be one period in which the voltage at the upper end of resistor 250 is fed only from the emitter electrode of transistor 236 due to the conductive condition of both transistors 174 and 276. This occurrence will be explained in connection with description of FIG. 8.

At the start of the sample time $t_s$, the voltage at the collector electrode of transistor 174 is seen to rise to a positive value and stays at the positive value until such time as the sample time is concluded. Also the voltage at the emitter of transistor 236 starts to rise at the start of the sample time and achieves a maximum voltage prior to or coincidental with the end of the sample time. Accordingly, during the sample time the voltage at the upper end of resistor 250 is maintained at a predetermined positive value. However, after the voltage at the collector of transistor 174 drops to zero, it is seen that the voltage at the collector of transistor 276 is already at zero, there being a slight delay in the voltage dropping due to the charging of capacitor 270. Accordingly, if no other voltage were present at the upper end of resistor 250, the voltage would drop to a zero level.

However, the voltage at the emitter of transistor 236 is at a positive level during this period to supply a voltage at the upper end of resistor 250. It is to be noted that the peak of the voltage at the emitter of transistor 236 is related to the resistance of the work piece and is a lesser value than the positive voltage achieved by the collector of transistors 174 and 276. Thus, the voltage at the upper end of resistor 250 will drop slightly after the sample time. When the voltage at the collector of transistor 276 again rises to the positive value of approximately 30 volts, the voltage at the upper end of resistor 250 will again rise to approximately 30 volts. The sequence is again repeated as illustrated in FIG. 8 with the initiation of the sample time.

It is to be noted that the voltage at the emitter of transistor 236 rises to a lesser positive value than previous occurred. Thus, the voltage at the upper end of resistor 250 drops to a positive level which is slightly less than that of the previous pulse. This condition continues until the voltage at the upper end of resistor 250 drops to a value which is sufficient to cause unijunction transistor 260 to conduct, thereby substantially completely discharging capacitor 246. As will be seen, the conduction of unijunction transistor 260 would normally terminate the weld time, absent any abnormal conditions, as for example, exceeding the maximum number of pulses or failing to achieve the minimum number.

Thus, at each impulse from the emitter electrode of transistor 236, the charge on capacitor 246 will increase relative to the voltage of the emitter of transistor 236. After the peak value has been reached, the capacitor 246 will store this peak charge until such time as the voltage on base 2 of unijunction transistor 260 drops below the critical value for conduction relative to the voltage on capacitor 246. After conduction, the capacitor 246 will discharge through the emitter base 1 junction of unijunction transistor 260 to produce a short positive pulse at base 1 of unijunction transistor 260. Obviously, the setting of the resistance-change potentiometer 240 will vary the charge on capacitor 246 as a direct function thereof. The higher the charge on capacitor 246, the earlier the uninjunction transistor 260 will fire after the peak resistance is reached. Thus, the firing point of the uninjunction transistor 260 may be controlled by varying the potentiometer 240. The output pulse from the base 1 electrode of uninjunction 260 is fed to an output conductor 304 by means of a capacitor 306 and diode 308 disposed between the base 1 electrode and the output conductor 304.

The operation of the unijunction transistor 260 is depicted in FIG. 9 wherein the lower portion indicates the charge on capacitor 246 as it builds up to a selected level depending on the peak resistance and the upper portion indicates the voltage impressed on resistor 250 which is dependent on the instantaneous resistance being sensed at the electrodes. It will be noted that when the critical firing point is reached, the charge on capacitor 246 discharges immediately through the emitter base 1 junction of unijunction transistor 260 to terminate the weld cycle. If the peak charge indicating the stored resistance is at a lesser level, it takes longer for the critical value of the unijunction transistor to be reached and the resistance will deteriorate to a lower value before the termination of the weld portion of the cycle.

Referring now to FIG. 3, it is seen that the output pulse from the unijunction transistor 260 is fed to the input circuit of a flip-flop 310 which includes a normally nonconductive transistor 312 and a normally conductive transistor 314. The input pulse on conductor 304 is fed to the base electrode of transistor 314 and, when the pulse occurs, tends to switch the transistor 314 to the conductive state which, in turn, renders the transistor 312 to the nonconductive state. The timing cycle is initially started by means of a pulse generated in the normal timer or manual timer and impressed on input conductor 316, the conductor 316 being connected to the base electrode of transistor 312 through a capacitor 320 and a diode 322. The base electrodes of transistors 312 and 314 are connected to a negative potential at 324 through resistors 326, 328, respectively. Further, a resistor 330, a diode 332 and capacitor 334 are connected from the base electrode circuit to ground. Similarly, a capacitor 336, diode 338 are connected between the base electrode of transistor 314 and ground potential. The collector emitter circuits of transistors 312 and 314 are fed from a common input potential at terminal 340 and through resistors 342, 344, respectively.

Thus, the weld is initially started by a pulse on conductor 316 to cause transistor 312 to go to the conductive state. This, of course, renders transistor 314 to the nonconductive state due to the cross coupling between transistor 312 and 314 by means of the resistor 348. The termination of the weld occurs when the pulse from the unijunction 260 appears on conductor 304 to switch transistor 314 to the conductive state. Also, a resetting pulse may be impressed on input conductor 350 which is connected to the base electrode of transistor 314 through diode 352. Also, this resetting pulse is fed FIG. 4 as will be explained hereinafter.

Assuming the system is in the automatic mode of operation, a manual-automatic switch 360 is in its automatic position to form a circuit from the manual timer connected to an input terminal 362 through the switch 360 through a resistor 364, a normally closed set of contacts 366 to the output terminal 370. Thus, during the welding cycle, the set of contacts 366 are open, as will be explained hereinafter, and during the non-weld portion the set of contacts 366 are closed.

The contacts 366 are controlled by means of a weld time control relay coil 380 connected in series circuit with the collector-emitter circuit of a transistor 382. When the transistor 382 is conductive, the coil 380 is energized to open the contacts 366 and start the weld cycle. Contrariwise, when the transistor 382 is nonconductive, the coil 380 is deenergized and the coil contacts 366 are closed to terminate the weld.

The normally conducting transistor 382 is controlled from the collector electrode of transistor 314 such that when the transistor 314 is nonconductive, a positive signal is fed to the base electrode of transistor 382 through resistor 386 to switch transistor 382 to the conductive state. At the termination of the weld time, the transistor 314 switches to the conductive state to substantially ground the base-emitter circuit of transistor 382 and render the transistor nonconductive. This termination of the weld time, and thus the deenergization of the transistor 382, occurs when the pulse on conductor 304 resets the flip-flop 310. However, this resetting can only occur if the cutoff selector circuit has removed the inhibit from the resetting pulse, as was described in conjunction with FIG. 1.

The cutoff selector circuit is illustrated at 400 in the upper left-hand corner of FIG. 3 and consists mainly of a controlled rectifier 402 having an anode connected to a positive source of potential at 404 through a resistor 406 and a grounded cathode circuit at 408. The operation of the controlled rectifier is controlled by means of a unijunction transistor 410, the base 1 electrode of which is connected to the gate circuit of control rectifier 402 by means of a resistor 412, capacitor 414 combination connected to ground, and serves to cause an initial charge to be placed on the capacitor 420 connected between a source of potential at 422 through a resistor 424 and the normal conducting path through the anode-cathode circuit of controlled rectifier 402. The capacitor 420 will be permitted to be charged due to the fact that the discharge path through transistor 430 connected to the capacitor 420 by a diode 432 is normally nonconductive. Accordingly, in the normal state, the transistor 430 is nonconductive and the controlled rectifier 402 is conductive to permit the capacitor 420 to be charged in a positive direction from resistor 424 through the controlled rectifier 402 to ground at 408. However, when the weld cycle is initiated, the normally nonconductive transistor 312 is rendered conductive which in turn renders normally conductive transistor 314 nonconductive. The collector electrode of transistor 314 rises from very nearly ground potential to a positive voltage.

This positive voltage is fed to the base electrode of transistor 430 by means of a conductor 454 and a resistor 438 to render transistor conductive. The conduction of transistor 430 discharges the capacitor 420 to extinguish the conductivity of controlled rectifier 402. This raises the anode voltage of controlled rectifier 402 to a positive value, very nearly 18 volts, which positive voltage is fed to a capacitor 444 by means of a conductor 446 and a resistor potentiometer combination 448. This causes the capacitor 444 to charge at a uniform rate for a preset time to permit a preselected number of pulses to pass through the welding circuit. When the preselected number of pulses, set by the potentiometer portion of combination 448, are stored and the emitter electrode voltage reaches the critical firing value for unijunction transistor 410, the transistor 410 will commence conduction and fire controlled rectifier 402.

During the time that the controlled rectifier 402 is off or nonconducting, the anode voltage, approximately 18 volts, is utilized to maintain transistor 312 in the conductive state due to the voltage at the anode being fed to the base electrode of transistor 312 through conductor 450, resistor 452 and conductor 436. This positive voltage being fed to the base electrode of transistor 312 maintains flip-flop 310 in the set state wherein transistor 312 is conductive and transistor 314 is nonconductive. Thus, any pulse being fed on conductors 304 will be ineffective to reset the flip-flop 310 during the period that the positive voltage is impressed on conductor 454. When the controlled rectifier 402 is rendered conductive again due to the firing of unijunction transistor 410, the inhibiting positive voltage will be removed from conductor 436 and the next pulse on conductor 304 in the train of pulses being fed thereto will be effective to reset the flip-flop 310. This operation thus precludes the weld cycle from being terminated prior to the occurrence of the minimum number of pulses selected by the potentiometer resistor combination 448.

Also because of the fact that the controlled rectifier 402 is in the minimum time period, that is, nonconductive, the transistor 382 will be rendered conductive in that a forward biasing voltage is fed to the base electrode thereof by means of a circuit including transistor 314 and resistor 386. Thus, if the controlled rectifier 402 is rendered conductive before transistor 314 of the flip-flop 310 is rendered conductive, the positive voltage of the collector of transistor 314 will maintain the base of transistor 382 positive and thus in the conductive condition. On the other hand, unless the system is in the minimum weld time, if transistor 314 of flip-flop 310 is conducting, transistor 430 is not conducting, the positive voltage of transistor 430 will maintain transistor 382 conductive through a circuit including conductor 460, diode 466 and resistor 468. Thus, the conduction of transistor 382 is generally controlled by the state of flip-flop 310 which is, in turn, controlled by the nonconductive state of controlled rectifier 402. However, during minimum weld time, transistor 382 is maintained in the conductive state both by the nonconduction of transistor 430 and the nonconduction of controlled rectifier 480, as will be hereinafter explained.

Referring now to FIG. 4, there is illustrated the various counters utilized in the construction of the present invention, as for example, the short time counter, a long time counter, and the production counter. Specifically, the short time counter includes a normally conductive controlled rectifier 480 having an anode electrode connected to the cathode electrode of the diode 466 through a conductor 490. During the minimum or short time, the controlled rectifier 480 is turned off by means of the discharge of a capacitor 484 through a pair of contacts 536 of weld time control relay 380, the capacitor having previously been charged from a source of DC potential at terminal 486 through a resistor 488. The conduction of the controlled rectifier 480 places substantially ground potential on a conductor 490, which, in turn, is connected to the gate electrode of a too short counter controlled rectifier 492 through a diode 466 (FIG. 3) and a conductor 494.

At the start of the weld, the controlled rectifier 480, after being turned off, holds conductor 490 at a positive level and the capacitor 498 charges through the low limit control circuit 502, including an adjustable potentiometer 504, through a resistor 506 connected to the source of positive potential at 580. When the charge of capacitor 498 has reached a sufficient level, the critical value of unijunction transistor 500, a positive pulse will be generated at the gate of controlled rectifier 480 through capacitor 510, and controlled rectifier 480 will be turned on. The remainder of the charge on capacitor 498 will discharge through the path including the control circuit 502 and the controlled rectifier 480.

During the period that the circuit just described, including controlled rectifier 480 and unijunction transistor 500, is timing out, the anode of controlled rectifier 480 will be at a positive potential, this positive potential being fed to transistor 382 through conductor 490 and resistor 468. This positive potential will maintain transistor 382 conductive to preclude the termination of the weld portion of the cycle prior to the minimum time, even though the automatic time control would have switched transistor 314 to the conductive state, thereby removing the positive voltage to the base of transistor 382 through resistor 386. On the other hand, if controlled rectifier 480 is rendered conductive before transistor 314 is rendered conductive, the positive voltage of the transistor 314 will maintain base electrode of transistor 382 positive to keep the transistor 382 in the conductive state.

The controlled rectifier 492 controls a low limit indicator relay coil 520, indicated to be the too short control relay, which is energized each time the f/f 310 resets before the low limit circuit has timed out. Thus, an indication of the number of times that the low limit circuit maintains transistor 382 in the conductive state are counted. The controlled rectifier 492 is normally not conductive and is rendered conductive by means of a signal from transistor 430 when the transistor 430 is rendered nonconductive. This occurs only when the controlled rectifier 480 is nonconductive. In case the SCR 480 is conductive, this would cause the clamping of this positive signal to ground through the conductor 490, thus preventing the SCR 492 from being turned on. Thus, if the controlled rectifier 480 is not conductive when transistor 430 is rendered nonconductive, this nonconduction of transistor 430 will be sensed by controlled rectifier 492 to energize the relay coil 520. The energization of the coil 520 closes a set of too short contacts 524, which places a pulse into counter 526 from the source of positive potential at input terminal 528. Also, with the conduction of controlled rectifier 492, an indicator lamp 530 is illuminated to provide an indication that the minimum time circuit has not timed out.

Further, a production counter device 534 is energized when the weld portion of the cycle has started due to the fact that a pair of contacts 536, of weld time control relay 380, are closed each time the weld is initiated. The controlled rectifier 492 is reset or taken out of conduction by means of a circuit including a controlled rectifier 540, having its anode-cathode electrode connected in circuit with a commutating capacitor 542 electrically connected to the controlled rectifier 492. Thus, when the controlled rectifier 492 commences conduction, the capacitor 542 is charged positive to negative from right to left. The reset of the rectifier 540 is controlled by either opening the reset button 543 or by means of the conduction of the controlled rectifier 540. The controlled rectifier 540, is, in turn, controlled by means of a pair of contacts 544 which are energized in response to the initiation of the weld portion of the weld cycle, the contacts being closed when the relay coil 380 is energized. This connects a source of positive potential at 546 to the controlled rectifier 540, including diode 548, resistor 549 and capacitor 550 connected in the gate circuit thereof.

A too long count circuit 560 has been provided which includes a timing circuit having a variable resistor 562 and a capacitor 564 associated therewith. The timing circuit is adapted to delay the conduction of a unijunction transistor 568 for a preselected period after the initiation of the weld portion of the cycle. Thus, the fact of the starting of the weld portion is fed to the timing circuit by means of a conductor 570 which is connected to the collector electrode of the transistor 314 associated with the weld flip-flop 310. Upon the initiation of the weld, a positive voltage is fed to the capacitor 564 to charge the capacitor at a constant rate until the critical voltage for the unijunction transistor 568 is reached. When this critical voltage is reached, a positive pulse will be placed on the B1 electrode of unijunction transistor 568 which will cause the controlled rectifier 574 to start conduction.

This conduction will energize the too long control relay 576 connected in series controlling relation with the controlled rectifier 574. The energization of the too long relay coil 576 closes a set of contacts 578 connected in circuit with the too long counter 580 to provide a continuous count of the number of times that the weld exceeds a preselected number of pulses or exceeds a predetermined time. Conduction of controlled rectifier 574 also energizes an indicator lamp 586 and causes a capacitor 588 to be charged.

The resetting of the controlled rectifier 574 is accomplished as was described in conjunction with the controlled rectifier 492 in that the capacitor 588 commutates the controlled rectifier 574 when the controlled rectifier 540 is energized. Normally, the automatic portion of the weld timer control will terminate the weld before the high limit timer circuit 560 has had sufficient time to time out. In this situation, transistor 314 (FIG. 3) will be conductive to clamp the capacitor 564 to ground. Thus, the unijunction transistor 568 will not conduct and the controlled rectifier 574 will not trigger.

A lockout circuit 600 has been provided which includes a timing circuit 602 having a controllable resistance 604 and a capacitor 606 which is charged in response to the energization of the line 570 as was described in conjunction with the circuit 560. Of course, the time limit for the override circuit 600 is considerably greater than the time for the circuit 560 to time out. When the critical time has been reached and capacitor 606 is charged to the critical voltage, a unijunction transistor 610 will conduct to feed a positive pulse to the gate electrode of a controlled rectifier 612 to cause conduction of the controlled rectifier 612.

This conduction energizes an override control relay 614 which it utilized to provide an external indication of the fact that the circuit has achieved an override condition. Also, an indicator lamp 618 is energized in response to the conduction of the controlled rectifier 612. As soon as the controlled rectifier 612 is conducting, the positively charged capacitor 624 discharges through the controlled rectifier 612, thus providing a negative pulse over line 624 to the base electrode of transistor 314, resetting the flip-flop 310 and terminating the weld time.

In normal cases, the weld control will terminate the weld before the lockout timer has timed out. In this situation, transistor 314 will be in the conductive state and will clamp the timing circuit connected to the lockout timer and unijunction transistor to ground. Thus, the lockout timer controlled rectifier will remain nonconductive and there will be no relay energization. As is stated above, normal commutating practices are utilized to reset the circuit for the various timers.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What we claim is:

1. In a timing circuit for a welding system of terminating the weld portion of a welding cycle in response to a variation in the resistance of the work at the weld electrodes comprising means for sensing a first and second electrical characteristic at the weld electrodes, variations in said characteristics providing an indication of the resistance and other variations of said welding system, means for generating an electrical signal in response to variations in the resistance and eliminating said other variations including means for sensing said characteristics and sampling said first characteristic during a variable sample time and means for varying said sample time in response to variations in one of said first and second characteristic.

2. The improvement of claim 1 wherein said characteristics include the voltage across the electrodes and the current through the work.

3. The improvement of claim 1 wherein said generating means includes chargeable means having an output signal of a magnitude related to the resistance.

4. The improvement of claim 3 wherein a charging voltage directly related to said voltage is applied across said chargeable means and said variable sampling time determines the charging time of said chargeable means.

5. The improvement of claim 4 wherein said sample time is inversely related to the magnitude of the current through the work.

6. The improvement of claim 5 wherein said generating means includes gate means connected between said voltage sensing means and said charging means, said gate means being enabled during said sampled time.

7. The improvement of claim 6 wherein further including means for initiating said sample time when said current is at a peak and the rate of change of current with respect to time is approximately zero.

8. The improvement of claim 6 wherein said gate means includes a diode junction connected between the voltage sampling circuit and the chargeable means.

9. The improvement of claim 8 wherein said diode junction is a two-terminal device.

10. The improvement of claim 9 wherein said gate means further includes a second diode junction connected in series with said first diode junction, the conduction of said second diode junction causing said first diode junction to eliminate the voltage signal from the point between said voltage sensing means and said chargeable means.

11. The improvement of claim 10 wherein said second diode junction is rendered forward biased during said sample time.

12. The improvement of claim 11 wherein said current sampling means includes means for rectifying alternating current portions of said current, said sampling time being varied in accordance with the amplitude of said rectified current.

13. The improvement of claim 12 wherein said current sensing means further includes polarity reversing means and biasing means, said biasing means being of a value to permit peaks of said rectified, reversed current to provide a baising voltage to control the sampling time, the sampling time varying as a function of the time said rectified, reversed current provides said biasing voltage.

14. The improvement of claim 13 wherein said sampling time varies as an inverse function of the amplitude of said rectified current.

15. The improvement of claim 14 further including resistance comparison circuit means including means for storing the maximum value of said resistance and means for sensing the instantaneous value of said resistance.

16. The improvement of claim 15 wherein said comparison circuit means includes a voltage responsive circuit for at least a first and second electrode, said stored resistance being fed to one of said first and second electrodes, and said instantaneous resistance being fed to the other of said electrodes, said voltage response circuit generating an output signal when said stored resistance signal and said instantaneous resistance signal bear a preselected relationship, one to the other.

17. The improvement of claim 16 wherein said preselected relationship is a preselected difference between said signals.

18. The improvement of claim 17 further including bistable storage means having a first and second state, said bistable storage means being switched from said first to said second state in response to said stored resistance and said instantaneous resistance signals achieving said preselected difference.

19. The improvement of claim 18 wherein said bistable storage means initiates and terminates the portion of a weld cycle, said storage means being switched to said first state to initiate said weld portion and being switched to second state to terminate said weld portion.

20. The improvement of claim 19 further including minimum weld portion time sensing circuit, said minimum time sensing circuit including means for sensing the initiation of said weld portion and means for timing a preselected duration for said minimum time.

21. The improvement of claim 20 wherein said minimum time sensing circuit inhibits the switching of said bistable storage means from said first to said second state prior to the timing of said minimum time.

22. The improvement of claim 21 wherein said bistable storage means includes an output amplifier and a flip-flop circuit.